United States Patent
Scipioni et al.

(10) Patent No.: US 10,332,167 B2
(45) Date of Patent: Jun. 25, 2019

(54) SYSTEMS, METHODS, AND COMPUTER PROGRAM PRODUCTS FOR ON-LINE GIFTING

(71) Applicant: PAYPAL, INC., San Jose, CA (US)

(72) Inventors: German Carlos Scipioni, San Jose, CA (US); Suzin Declerck Wold, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 348 days.

(21) Appl. No.: 15/073,143

(22) Filed: Mar. 17, 2016

(65) Prior Publication Data

US 2016/0196594 A1  Jul. 7, 2016

Related U.S. Application Data (63) Continuation of application No. 13/428,894, filed on Mar. 23, 2012, now Pat. No. 9,299,096.

(51) Int. Cl.
*G06Q 30/00* (2012.01)
*G06Q 30/06* (2012.01)

(52) U.S. Cl.
CPC ......... *G06Q 30/0605* (2013.01); *G06Q 30/06* (2013.01); *G06Q 30/0601* (2013.01); *G06Q 30/0637* (2013.01); *G06Q 30/0641* (2013.01); *G06Q 30/0643* (2013.01)

(58) Field of Classification Search
CPC .......... G06Q 30/0601; G06Q 30/0605; G06Q 30/0637; G06Q 30/0641; G06Q 30/0643
USPC .............................................. 705/26.1, 27.1
See application file for complete search history.

(56) References Cited

U.S. PATENT DOCUMENTS

| | | | |
|---|---|---|---|
| 6,321,211 B1 | 11/2001 | Dodd | |
| 7,124,113 B1 * | 10/2006 | Fairclough | G06Q 20/04 705/50 |
| 7,673,327 B1 | 3/2010 | Polis et al. | |
| 8,015,068 B2 | 9/2011 | Swamy et al. | |
| 9,809,159 B1 * | 11/2017 | Snyder | B60Q 1/525 |
| 2001/0007099 A1 * | 7/2001 | Rau | G06Q 30/02 705/26.8 |
| 2001/0049607 A1 | 12/2001 | Tanaka et al. | |
| 2002/0045442 A1 | 4/2002 | Silen | |
| 2002/0073148 A1 * | 6/2002 | Haines | G06Q 10/087 709/204 |
| 2002/0087356 A1 * | 7/2002 | Andros | G06Q 30/02 705/2 |
| 2003/0120849 A1 | 3/2003 | Roslak et al. | |
| 2003/0191817 A1 | 10/2003 | Fidler | |
| 2005/0015311 A1 | 1/2005 | Frantz et al. | |
| 2005/0195157 A1 | 9/2005 | Kramer et al. | |

(Continued)

FOREIGN PATENT DOCUMENTS

CN   101287195 A * 10/2008 ............... H04Q 7/32

*Primary Examiner* — Yogesh C Garg
(74) *Attorney, Agent, or Firm* — Haynes and Boone, LLP (57) ABSTRACT

A method includes receiving an identification of a first item to be purchased, entering the first item into an electronic shopping cart facilitating an on-line transaction, providing a method of payment for a value of the first item to the shopping cart, and sending the value of the first item and a description of the item to a recipient with at least the following electronic options from which the recipient may choose: accepting the first item with payment made and modifying the transaction in accordance with the value of the first item.

20 Claims, 6 Drawing Sheets

(56) References Cited

U.S. PATENT DOCUMENTS

| | | |
|---|---|---|
| 2006/0143123 A1 | 6/2006 | Rallo |
| 2007/0050711 A1 | 3/2007 | Walker et al. |
| 2008/0015959 A1 | 1/2008 | Kruglikov |
| 2009/0076868 A1* | 3/2009 | Malone .............. G06O 30/0601 705/35 |
| 2009/0089417 A1* | 4/2009 | Giffin ....................... H04L 51/04 709/224 |
| 2009/0248420 A1* | 10/2009 | Basir .................. H04M 1/6075 704/275 |
| 2010/0138316 A1* | 6/2010 | Connors ................. G06F 21/57 705/26.1 |
| 2010/0198700 A1* | 8/2010 | Ramaswamy ......... G06Q 30/02 705/26.1 |
| 2011/0202770 A1 | 8/2011 | Castaldi et al. |
| 2011/0270665 A1 | 11/2011 | Kim et al. |
| 2012/0011067 A1* | 1/2012 | Katzin ................. G06Q 20/027 705/44 |
| 2012/0072304 A1 | 3/2012 | Homan |
| 2013/0030945 A1 | 1/2013 | Polt |
| 2013/0218728 A1* | 8/2013 | Hashop .............. G06Q 30/0603 705/27.1 |

* cited by examiner

SYSTEMS, METHODS, AND COMPUTER PROGRAM PRODUCTS FOR ON-LINE GIFTING

CROSS REFERENCE TO RELATED APPLICATION

This application is a continuation of U.S. Ser. No. 13/428,894, filed on Mar. 23, 2012, which is incorporated herein in its entirety.

BACKGROUND

Technical Field

The present disclosure generally relates to on-line transactions, and more particularly, to techniques for facilitating on-line gifting.

Related Art

Recent advances in the fields of telecommunications and integrated circuits have drastically increased the popularity of portable electronic telecommunication devices. As some non-limiting example, these portable telecommunication devices may include smart phones, computer tablets, or laptops. Users of these devices may use them to perform a variety of tasks. For example, many smart phones and computer tablets can be used to scan a product at a store and extract information about such product. The extracted information may include the description of the product, names of other retailers (either online or physical) carrying the product, prices of the product at the other retailers, and other suitable information. These capabilities of the portable telecommunication devices have not, however, been fully utilized to create a better shopping experience for their users who may be shopping at a brick and mortar store or on-line.

Furthermore, physical shopping at brick and mortar stores has some advantages over on-line shopping. For instance, a shopper who is looking for a gift for another person can purchase an item and request a gift receipt at the register. The gift receipt is usable by the recipient of the gift to return the gift and either exchange the gift for another item, get store credit, or get cash value. The gift receipt allows the giver to shop knowing that, should the giver pick an unwanted item, the recipient can still benefit from the full return value of the item. One on-line technique to approximate this transaction includes a send-as-a-gift option from Amazon™, which allows a user to send a physical item as a gift, but the physical world process is more efficient and easy. For instance, a recipient of a gift in this on-line process who desires to return the gift must physically return the gift, wait for the credit to be processed then select something else. It takes several days for the whole process to complete, and it is not done in the same store visit. On-line gifting could benefit from efficiency and ease.

SUMMARY

One of the broader forms of the present disclosure involves a method that includes receiving an identification of a first item to be purchased, entering the first item into an electronic shopping cart facilitating an on-line transaction, providing a method of payment for a value of the first item to the shopping cart, and sending the value of the first item and a description of the item to a recipient with at least the following electronic options from which the recipient may choose: accepting the first item with payment made and modifying the transaction in accordance with the value of the first item.

Another one of the broader forms of the present disclosure involves a computer program product having a computer readable medium tangibly recording computer program logic for facilitating electronic gifting, the computer program product including: code to select a first item available for purchase from an e-commerce resource, code to enter a method of payment for the first item to cover at least a value of the first item, and code to send with a description of the first item and at least the value of the first item covered by the method of payment, to a recipient with the following electronic options: accept delivery of the first item, decline the first item and use at least the value of the first item for a second item, and decline the first item and receive a cash value for at least the value of the first item.

Another one of the broader forms of the present disclosure involves an electronic device that includes an input/output interface operable to receive an input from a user and communicate an output to the user, a transceiver operable to electronically communicate with a computer network, a computer processor operable to execute instructions, and a memory storage operable to store the instructions, the memory storage further comprising a program module that is operable to: select a first item from an e-commerce resource on behalf of a first person, enter a method of payment from the first person to cover at least a value of the first item, and sending an electronic shopping cart to a second person with the first item paid for and the following options: i) accept the first item as a gift, and ii) decline the first item and use at least the value of the first item for something else.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

According to the various aspects of the present disclosure, a method, system, and computer program product are discussed below that improve on-line gifting.

In one example, a user enters a physical store and identifies an item that the user desires to present to the recipient as a gift. The user then uses a smartphone with a camera to scan a bar code or Quick Response (QR) code of the item, usually on a poster, tag on a rack, on a sticker or physically printed on the item. An application on the smartphone employs the bar code data to gather information about the item and to direct the user to an on-line transaction to purchase the item. The on-line transaction is provided by one or more e-commerce programs at one or more servers on a network, such as the Internet.

Continuing with the example, the user enters a form of payment and an electronic address of the recipient. The user also indicates that the item is intended as a gift for the recipient. The e-commerce program then sends a message to the recipient indicating that the recipient has received a gift from the user.

The recipient then links to the transaction or joins the transaction some other way, such as by logging into an email account, an account with the merchant or a payment provider. The recipient is presented with options, which may include accepting the item for delivery, choosing one or more other items instead (e.g., choosing a sweater instead of jeans, or choosing the same item in a different color), and/or receiving cash value or a store credit. The process may be described in some embodiments as creating an electronic shopping cart (as is commonly used in conventional e-commerce transactions) with the added technique of transferring the shopping cart with payment made to a gift recipient before a purchase of the item itself has actually been completed.

In this manner, the recipient has the same flexibility as the recipient would have had if the user had sent the physical item to the recipient with a gift receipt. The user also has the peace of mind of knowing that the value of the transaction will not result in an unwanted item. Additionally, the recipient need not actually go to a brick and mortar store for an exchange of the gift because the recipient can use e-commerce tools to either pick other items or indicate a desire for cash value or store credit.

Of course, the scope of embodiments is not limited to the examples above. For instance, some embodiments allow the user to initially pick the gift item on-line rather than in-store. Also, there are a wide variety of permutations for facilitating the transaction, whether through a merchant in conjunction with a payment service, by the merchant alone, by the payment service with a universal shopping cart, and/or the like.

Various embodiments include among other things methods in accordance with the description above, as well as applications for use on a handheld communication device or personal computer by the gift giver and/or the recipient. The examples below provide a detailed illustration of several example embodiments.

Figure 1:
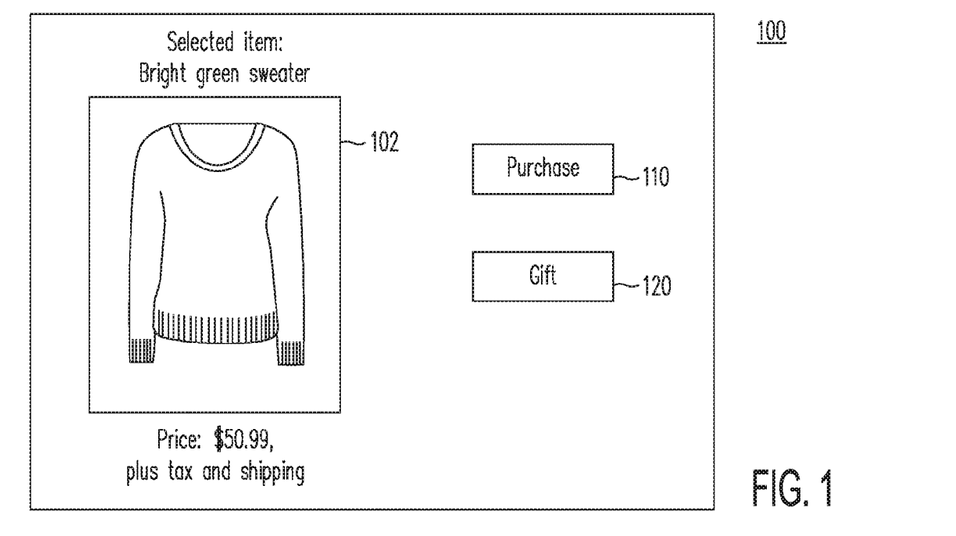
FIGS. 1-5 illustrate example user interfaces of an example application program according to various aspects of the present disclosure.

FIG. 1 illustrates an example user interface 100 for a portable electronic device adapted according to one embodiment. In the illustrated embodiment, the portable electronic device is a smart phone. In alternative embodiments, the portable electronic device may be another suitable electronic device such as a computer tablet or a laptop. A user may download application software programs, also known as "apps" or "applications" to the portable electronic device. In general, applications are computer software programs designed to execute specific tasks. As examples, both Apple's® App Store and Google's® Android Market offer a multitude of applications, including entertainment programs, business applications, file management tools, and other widgets, etc.

Interface 100 is an example of an interface seen by the gift giver when selecting an item and gifting the item. Interface 100 may be embodied in any appropriate manner, such as on a touch screen interface or another Graphical User Interface (GUI) that uses a mouse or other pointing device.

FIG. 1 starts off after the gift giver has already selected an item. Actions for selecting the item are described in more detail with respect to FIGS. 6-9. The gift giver has selected a green sweater, which is shown in thumbnail image 102. Interface 100 provides the price as well as an indication that taxes and shipping may apply. Buttons 110 and 120 allow the gift giver to select between a conventional purchase and a gift purchase. The present description focuses on the gift purchase and, therefore, does not describe in detail the conventional purchase option.

Figure 2:
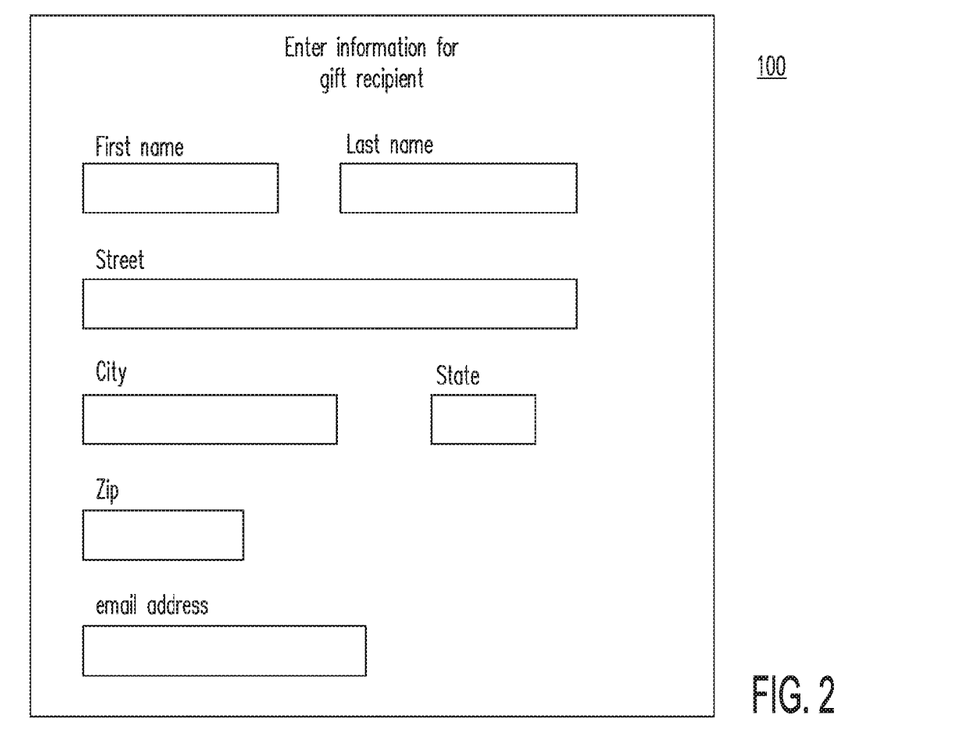

When selecting the gift option of button 120, the gift giver is presented the screen shown in FIG. 2. FIG. 2 is an example screen to enter the information for the recipient, according to one embodiment. In the present example, the gift giver enters the recipient's name, mailing address for receiving the purchased item, and electronic address for contacting the recipient.

Figure 3:
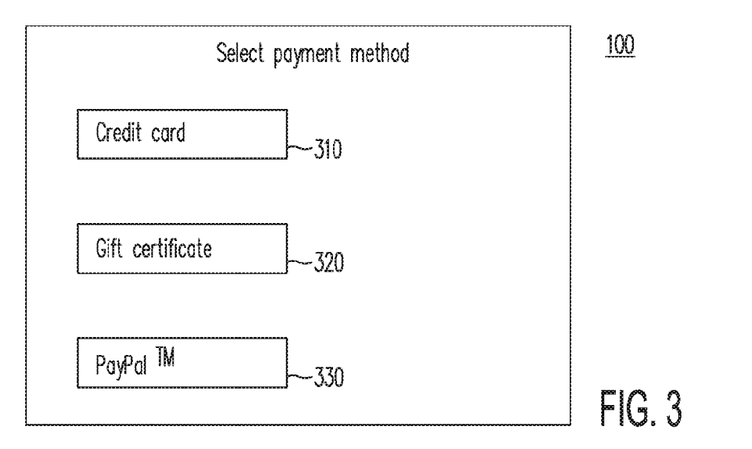

In some embodiments, it might be desirable to allow the gift giver to select the recipient from among a list of contacts on the gift giver's device rather than enter the information in by hand. To that end, another example may provide for the application to access the gift giver's contacts and present the list of contacts as a list of options (not shown) from which the gift giver may choose. Such an example may be facilitated by the fact that most people have a contact list in use on their handheld devices. However, the details of interface 100 of FIGS. 1-3 are examples only, and it is understood that other appropriate techniques to select an item, pay for the item, and select a recipient are within the scope of embodiments.

Another way to identify a recipient and an address of the recipient is to use on-line resources, such as a social networking site (e.g., Facebook™) or another on-line contact list (e.g., the contact list at the payment service, PayPal™). For example, a giver may send the gift to an email address of the recipient, who can fill in the info by logging into an on-line resource. In an example wherein a payment service such as PayPal™ intermediates the transaction, the payment service can pre-populate the recipient's physical address upon recognizing the recipient's email address.

In some examples, the physical address of the recipient may affect the total price of the item. For instance, the physical locations of the gift giver, the merchant, and/or the recipient may affect the amount of shipping cost and/or the amount of taxes that are added to the cost of the item itself. In this embodiment, the application keeps track of the total cost, including taxes and shipping, in order to complete the transaction. In one example, the merchant or payment service may calculate the shipping based on the recipient's address without immediately sharing that information with the giver while the giver is selecting the item. Knowledge of the recipient's zip code is usually good enough to calculate tax and shipping for a gift.

Furthermore, the contact information of the recipient may correspond to one or more accounts in the name of the recipient. For instance, a merchant selling the item may recognize the recipient's information as that of a registered user on its e-commerce site. If the recipient is a registered user, then the recipient may complete the transaction through his or her user account after receiving notice of the gift. In one example, the recipient is identified within a loyalty program of the merchant and may receive points on the purchase. The actions by the recipient are discussed later with respect to FIG. 5.

FIG. 3 shows interface 100 at a portion wherein the gift giver enters a payment method according to one embodiment. The screen of FIG. 3 shows buttons 310, 320, 330 to select a credit/debit card payment, a gift certificate/gift card payment, and payment by a payment service, such as PayPal™. When a user selects one of the buttons 310, 320, 330 the user is directed to a subsequent screen (not shown) to enter information such as a credit card number, a gift certificate number, or a PayPal™ login.

Figure 4:
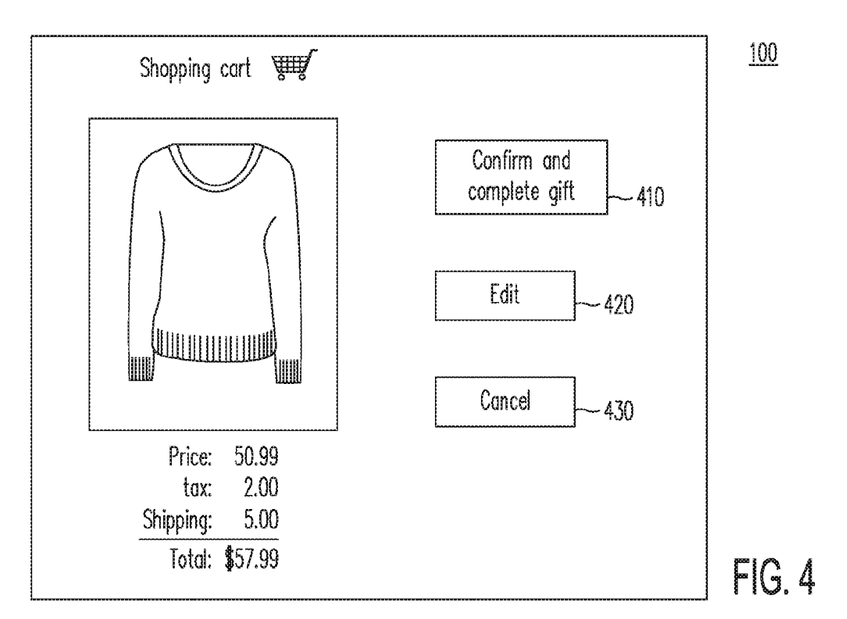

Any appropriate form of payment now known or later developed can be used in the various embodiments. Furthermore, various embodiments may include other screens for the gift giver, such as a screen wherein the gift giver views the shopping cart and has a chance to confirm the transaction, edit the transaction, or cancel the transaction. FIG. 4 shows a shopping cart screen for interface 100, adapted according to one embodiment.

In FIG. 4, the price of the item is totaled with other fees—in this case, tax and shipping. Buttons 410, 420, 430 allow the gift giver to either complete the gift transaction, edit the transaction, or cancel the transaction. When the gift giver selects button 410, the transaction is nearly complete, but not entirely. The gift giver has finalized payment, but the recipient still has the option to accept the gift as-is or to change the transaction, as explained in more detail below.

The screen of FIG. 4 is shown as an electronic shopping cart, though transferring the shopping cart to the recipient may or may not include presenting the very same looking interface to the recipient or providing the same capabilities to the recipient as are provided to the gift giver in the screen of FIG. 4. In this example, transferring the shopping cart includes processing payment for the gift at the giver's side and presenting the item, payment made, and various options to the recipient.

The method continues by transferring the shopping cart to the recipient. In one example, an underlying e-commerce resource sends an email to the recipient explaining that the recipient has received a gift and providing a hypertext link. Upon selecting the link, the recipient is directed to a web portal that displays the gift and the options.

Figure 5:
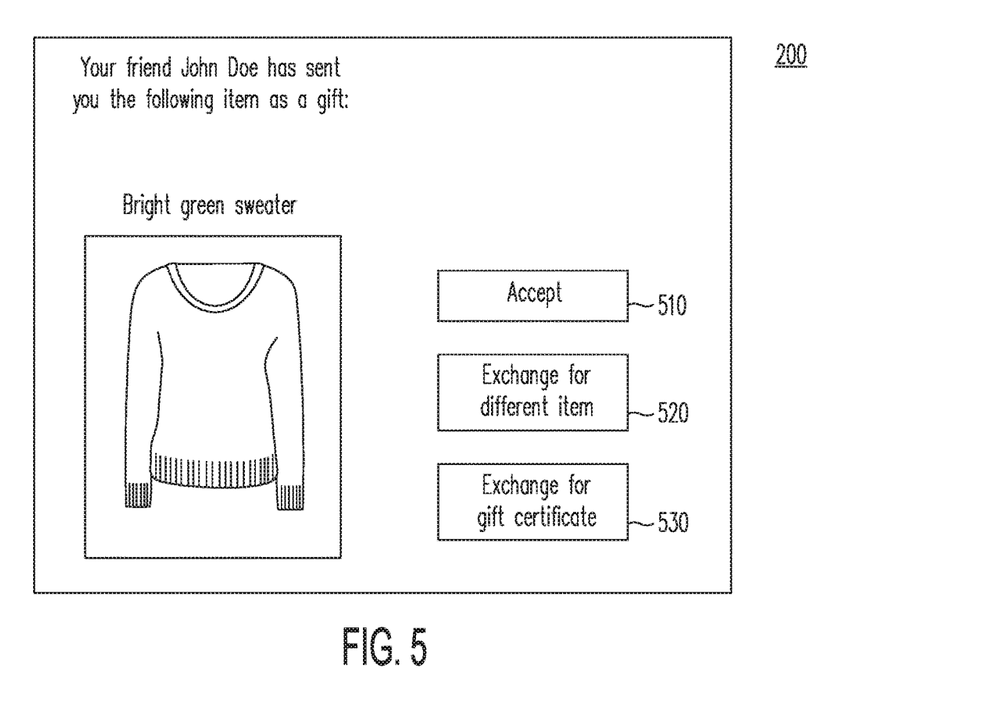

FIG. 5 is an illustration of exemplary recipient-side interface 200, adapted according to one embodiment. Interface 200 may be accessed via a web portal, as in the example above, through an application on the recipient's device, or in any other appropriate manner. In some examples, the recipient may already have a user account for the underlying e-commerce facility (such as an account with a merchant from whom the gift was bought). In such a scenario, the recipient may access the gift through his or her existing account. Thus, the recipient may have access to additional capabilities, such as the ability to add the cash value of the gift to existing credits when editing the transaction.

In other examples, the recipient does not need an account to access the gift, depending on the particular implementation. In any event, the recipient is provided with two or more options, which in this example are represented by buttons 510, 520, 530.

By selecting button 510, the recipient may accept the gift as-is. Accordingly, the user would receive the gift, with taxes and shipping already paid. In some instances, the recipient may be able to edit the shipping address, send a thank-you note, and/or the like.

Button 520 allows the user to exchange the item for a different item, with the total gift value (including taxes and shipping) applied toward the exchange. For instance, if the recipient likes the sweater but does not like the color, the recipient may exchange the sweater for a different color. Similarly, the recipient may edit the purchase to receive the sweater in a different size. However, the recipient is not obligated to get the sweater and may choose to browse a catalog of other items (for instance, from the same merchant) and choose one or more other gifts instead.

Should the user spend less than the full amount provided by the gift giver, the remaining amount may be provided to the user in cash (for instance, into the user's payment account), as a gift card, as store credit or in any other appropriate way. Should the recipient spend more than the full amount, the system may offer the recipient a chance to cover the overage with payment made by the recipient.

Continuing with the example of FIG. 5, the recipient may also select button 530, which allows the recipient to exchange the item for a gift card or store credit. The gift card/store credit may be for the same merchant from which the gift was selected or from a related merchant. In yet another example, the recipient might select to have the value of the gift in cash rather than in a gift card limited to any particular merchant. For instance, the recipient might choose to have the cash value added to a prepaid debit card or added to the recipient's electronic wallet at a payment service such as PayPal™.

Thus, the example above shows how a gift giver may purchase a gift for a recipient, while allowing the recipient to use the full value of the gift toward other items or as a cash value. The example above transfers a shopping cart with payment made to the recipient, while still allowing the recipient to make choices as to the use of the gifted value.

Figure 6:
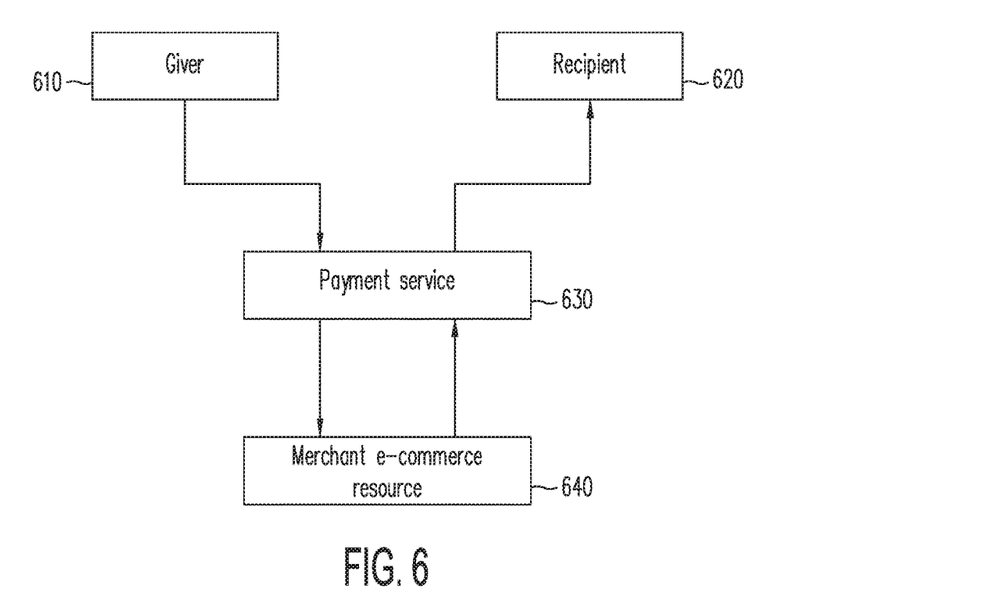
FIGS. 6-8 illustrate example relationships among a gift giver, a recipient, a merchant, and a payment service, which may be implemented according to various aspects of the present disclosure.
Figure 7:
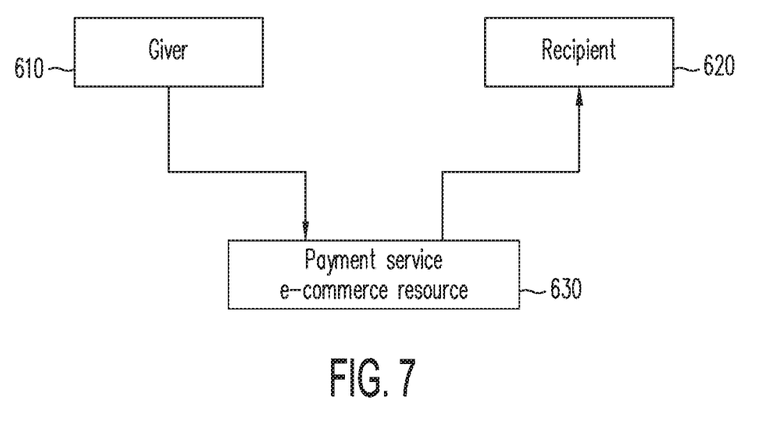
Figure 8:
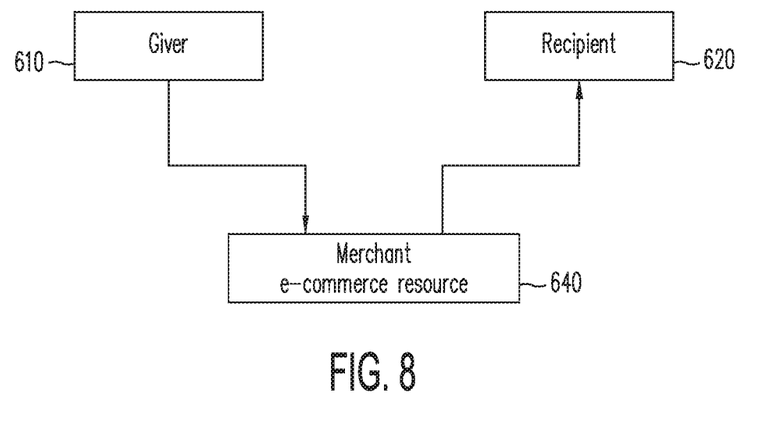

The embodiments described above may be configured in any appropriate manner. FIGS. 6-8 illustrate possible relationships between the giver 610, the recipient 620, an on-line merchant 640, and a payment provider 630, according to different embodiments. Of course, FIGS. 6-8 are not exhaustive, as other arrangements are possible.

In FIG. 6, both the gift giver 610 and the recipient 620 are associated with a payment service 630, such as PayPal™. Payment service 630 has a relationship with merchant 640 so that giver 610 and recipient 620 can access the e-commerce resource of the merchant 640 by, e.g., browsing the merchant's catalog and purchasing items from the merchant 640 via their respective accounts with the payment service 630. The e-commerce resource in this example includes the underlying e-commerce infrastructure and abilities of the merchant, such as computers, processing programs, product databases, customer service resources, and the like, to facilitate the purchase electronically.

In one example, the payment service 630 provides an application that allows giver 610 to gift items from merchant's 640 e-commerce resource and pay for the gift seamlessly using payment service 630. Similarly, recipient 620 accesses the shopping cart using his or her account with payment service 630 (e.g., through an application), allowing recipient 620 to credit or debit his or her account directly and even to add the value of gift as cash to the account, if allowed.

The arrangement of FIG. 6 represents a close business relationship between the payment service 630 and merchant 640. For instance, in one example, the giver 610 scans a code on an item at a brick and mortar store of the merchant using an application provided by payment service 630. In another example, giver 610 selects the item from the merchant's on-line catalog. Payment service 630 then cooperates with merchant 640 to provide the catalog information and purchasing resources to the giver 610 within the application.

FIG. 7 represents another configuration wherein payment service 630 provides the abilities described above with respect to FIGS. 1-5 in a manner that is not limited to any one merchant. In one such embodiment, the user scans an item at a brick and mortar store using an application provided by payment service 630. The e-commerce resource at payment service 630 then performs an Internet search to find the item offered by a multitude of merchants around the world for shipping (e.g., a universal shopping cart).

The giver 610 can then enter the item in a shopping cart, as if it was purchased from one of the merchants, and make payment therefore. Payment service 630 then, rather than processing the payment with a merchant, transfers the shopping cart to the recipient 620. The recipient 620 has the options provided in FIG. 5. If the recipient 620 accepts the item or another item, payment service 630 makes payment to one or more of the merchants. Should recipient 620 choose a cash value of the gift, payment service 630 can credit his or her payment account accordingly.

In FIG. 7, payment service 630 uses its own e-commerce resource to provide the shopping cart to both giver 610 and recipient 620. In an additional embodiment, it is possible for payment service 630 to employ a utility that performs a screen scrape of a shopping cart provided by a merchant. For instance, the giver 610 may select an item from a merchant using the merchant's e-commerce resource and, rather than completing the transaction, employ a tool from payment service 630 perform a screen scrape of the displayed page. The screen scrape may include parsing the HTML or other code of the displayed page to read the information therefrom. Giver 610 can then cancel the transaction with the merchant, if desired. Payment service 630 can then proceed by finding the selected item at a number of different merchants on the Internet and provide the shopping cart to recipient 620 as described above. In fact, any manner of gathering items from which to select and then arranging payment is within the scope of embodiments.

FIG. 8 represents yet another configuration that is centered around merchant 640 and not limited to any particular payment service. In this example, giver 610 selects the item from a brick and mortar store or on-line catalog of the merchant 640, and the merchant provides the functionality of FIGS. 1-5 via its own e-commerce resource and, perhaps, applications on devices associated with giver 610 and recipient 620.

With respect to the inventory itself, in any of the examples above the inventory may not actually be held upon selection by giver 610, since recipient 620 may decline the selected item. However, in another example, an entity with access to the e-commerce resources may hold the inventory for recipient 620 and give recipient 620 a specified time period until the inventory hold is released, thereby effectively reserving the inventory for the recipient. Such a technique may be especially desirable for giver 610 and/or recipient 620 when the selected item is in high demand and is expected to go out of stock relatively soon.

Figure 9:
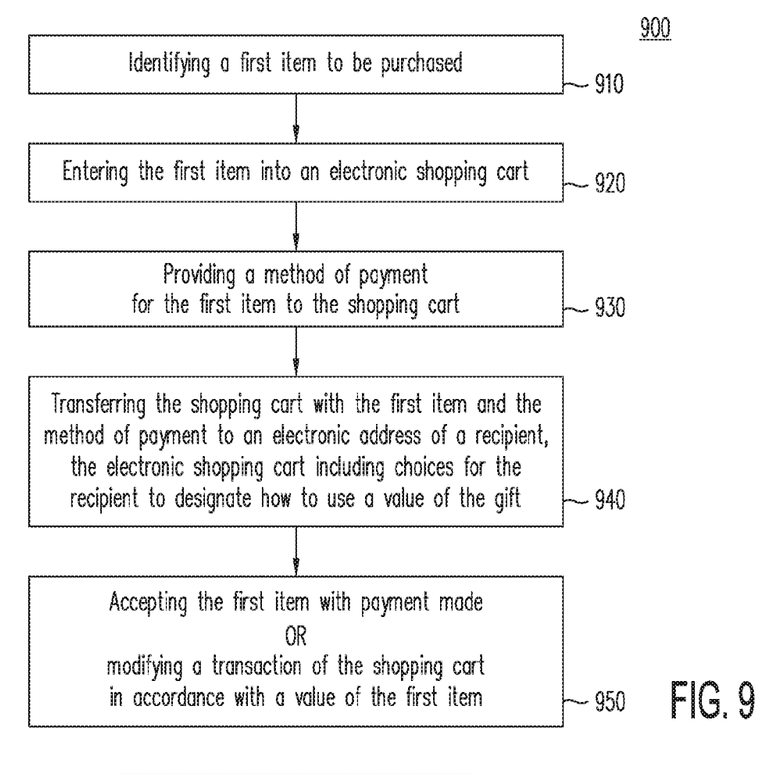
FIG. 9 illustrates a flowchart containing example process flows according to various aspects of the present disclosure.

FIG. 9 is an illustration of method 900, adapted according to one embodiment, to facilitate e-commerce gifting. The actions of FIG. 9 may be performed by an application, browser, or other utility of the giver/recipient and/or by the e-commerce resource of a merchant and/or payment provider. In some embodiments, the various actions are carried out by one or more computer processors executing computer code to provide the described functionality.

In action 910, the giver identifies a first item to be purchased. The giver can identify the item in any appropriate manner including selecting the item from an on-line catalog, scanning a code associated with the item, entering a description of the item, and/or the like.

In one particular example, the user employs a camera on a handheld communication device to record an image of a bar code or QR code of an item at a brick and mortar location. In some instances, the gift giver uses an application that assumes the user is at a particular merchant, such as when the application is associated with a particular merchant. In another example, the application is "smart" enough to detect the store where the gift giver is located, for example by GPS signals, or technologies inside the store such as its Wi-Fi network or Radio Frequency Identification (RFID) devices installed at the store, or by one or more pictures of the store, or directly from the QR code.

In other examples, the gift giver may use tools other than his or her own handheld communication device. For instance, the merchant may provide a scanning device at the store to read tags on the merchandise. The gift giver may then proceed to a kiosk or checkout register to enter payment and provide an electronic and/or physical address of the recipient. Additionally or alternatively, the gift giver may select the gift from an on-line catalog, whether or not the gift giver is located in-store at the time.

In action 920, the first item is entered to an electronic shopping cart. The electronic shopping cart may be associated with the merchant selling the item (as in FIGS. 6 and 7) or may be associated with another merchant (as in FIG. 8).

In action 930, the user provides a method of payment for the first item to the shopping cart. The method of payment covers the item and any associated fees, such that if the recipient accepts the gift as-is, the transaction is finalized and the item is shipped to the recipient at no cost to the recipient. In another example, the user selects to pay for the value of the item, plus any other fees, with an option to add more value in case the recipient chooses a different item with a higher value. For example, a giver orders a $35 game for the recipient but lets the recipient pick another item up to $45.

The method of payment may include, e.g., a gift card, a store credit, a debit or credit card, payment directly from a bank account, and/or payment from a payment service. Whether the payment is actually processed and finalized at this point, it is noted that the first item itself is not necessarily selected in any final way as part of the transaction because the recipient may still choose not to receive the item.

In action 940, an e-commerce resource transfers the shopping cart with the first item and the method of payment to an electronic address of the recipient. For instance, the recipient may receive an email, text, or other message informing him or her of the gift. In another aspect, the recipient may or may not receive an electronic alert of the gift, but accesses the gift over a network—in which case, the recipient's electronic address is his or her network address. The transferred shopping cart represents a transaction that is partially completed, leaving choices to the recipient as to how to use the value of the gift.

In action 950, the recipient can choose to accept the first item with payment made or modify the transaction of the shopping cart in accordance with a value of the first item. Thus, the recipient can choose to have the item delivered as-is or may choose to do something else with the value of the item. In one example, the recipient may choose to receive one or more different items and/or receive some or all of the gift's value in cash or gift card credit.

Another aspect of various embodiments is that each of actions 910-950 may be performed using e-commerce resources of a merchant, payment service, or third party. For instance, actions 910-930 may include receiving an identification of the item from the giver, entering the data from the identified item into electronic shopping cart, and receiving a method of payment to apply to the gift from the user. The recipient's choices at action 950 are provided by the e-commerce resource and acted upon by the e-commerce resource upon receiving the recipient's choice.

The scope of embodiments is not limited to the particular flow shown in FIG. 9. Rather, other embodiments may add, omit, rearrange, or modify one or more actions in accordance with a given design. For instance, while the examples above are described with respect to a gift giver selecting a single item for a single recipient, the scope of embodiment is not so limited. Various embodiments may allow a gift giver to select multiple items for the same or different recipients. Also, in another example, an embodiment further includes sending confirmation to the gift giver that the recipient has made a choice or received delivery of a gift.

Furthermore, while the examples above are provided in the context of transferring an electronic shopping cart to the recipient, another way to describe various embodiments is that the gift giver transfers a description of the item and the value of the item to the recipient with electronic options for the recipient to accept delivery of the item or to modify the transaction. In one example, the giver sends a gift card (physical or electronic) with the value of the item in it plus a description of the item in, e.g., a QR code. The recipient accesses the gift electronically by, e.g., interacting with a message notifying the recipient of the gift or scanning the QR code with a handheld device application. The recipient is then presented with the options described above.

Figure 10:
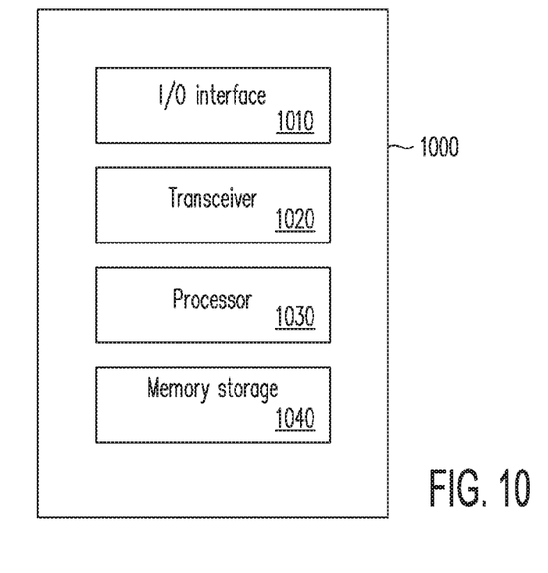
FIG. 10 illustrates a block diagram of a computer system for implementing various methods and devices described according to various aspects of the present disclosure.

FIG. 10 is a simplified block diagram of an example electronic device 1000 on which the application (accessed by the gift giver or the recipient) may be implemented according to various aspects of the present disclosure. The electronic device 1000 may be a portable personal electronic device, such as a smart phone, laptop, or a tablet. The electronic device 1000 may also be a more powerful computer, for example a server computer. The electronic device 1000 includes an input/output interface 1010. The interface 1010 is operable to receive an input from a user and communicate an output to the user. The user may include a gift-giver or a recipient. In an embodiment, the input/output interface 1010 includes a visual display unit, for example a touch-sensitive screen. Input/output interface 101 may display a graphical interface, such as interfaces 100 and 200 of FIGS. 1-5.

The electronic device 1000 includes a transceiver 1020. The transceiver 1020 is operable to electronically communicate with external devices. In an embodiment, the transceiver 1020 is operable to wirelessly communicate with cellular towers or other network access points and infrastructure. The electronic device 1000 also includes a computer processor 1030 that is operable to execute computer instructions and a memory storage 1040 that is operable to store the computer instructions.

The memory storage 1040 also contains a program module that is an embodiment of the application that interacts with the gift giver, the recipient, and the e-commerce resource. The program module operates to provide giver-side and/or recipient-side actions, such as facilitating item selection, payment, triggering transfer of the shopping cart, and gift acceptance/exchange.

Figure 11:
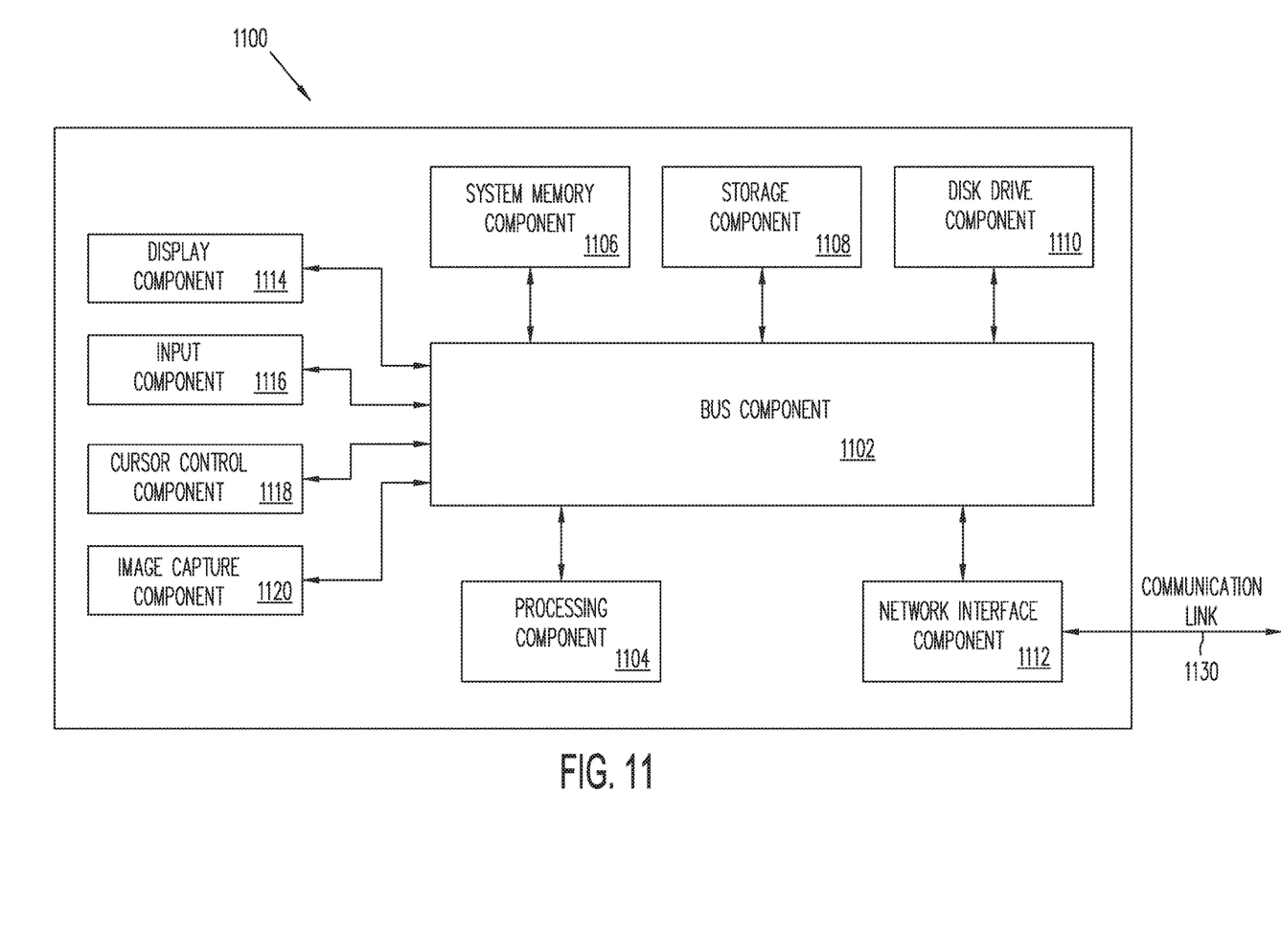
FIG. 11 illustrates a block diagram of a computer system for implementing various methods and devices described according to various aspects of the present disclosure.

FIG. 11 is a block diagram of a computer system 1100 suitable for implementing various methods and devices described herein, for example, the various method blocks of the method 900. For example, the computer system may 1100 may represent a computer upon which the gift giver or recipient sees interfaces 100 and/or 200. In another example, the computer system 1100 may represent a server computer or other type of computer that can be used as part of an e-commerce infrastructure at the merchant, payment service, or third party. Accordingly, it should be appreciated that each of the devices may be implemented as the computer system 1100 for communication with a network in a manner as follows.

In accordance with various embodiments of the present disclosure, the computer system 1100, such as a mobile communications device and/or a network server, includes a bus component 1102 or other communication mechanisms for communicating information, which interconnects subsystems and components, such as processing component 1104 (e.g., processor, micro-controller, digital signal processor (DSP), etc.), system memory component 1106 (e.g., RAM), static storage component 1108 (e.g., ROM), disk drive component 1110 (e.g., magnetic or optical), network interface component 1112 (e.g., modem or Ethernet card), display component 1114 (e.g., touch-screens, cathode ray tube (CRT) displays, or liquid crystal display (LCD)), input component 1116 (e.g., keyboard or touch-sensitive components operable to detect a touch by a human body), cursor control component 1118 (e.g., mouse or trackball), and image capture component 1120 (e.g., analog or digital camera). In one implementation, disk drive component 1110 may comprise a database having one or more disk drive components.

In accordance with embodiments of the present disclosure, computer system 1100 performs specific operations by processor 1104 executing one or more sequences of one or more instructions contained in system memory component 1106. Such instructions may be read into system memory component 1106 from another computer readable medium, such as static storage component 1108 or disk drive component 1110. In other embodiments, hard-wired circuitry may be used in place of (or in combination with) software instructions to implement the present disclosure.

Logic may be encoded in a computer readable, non-transitory medium, which may refer to any medium that participates in providing instructions to processor 1104 for execution. Such a medium may take many forms, including but not limited to, non-volatile media and volatile media. In various implementations, non-volatile media includes optical or magnetic disks, such as disk drive component 1110, and volatile media includes dynamic memory, such as system memory component 1106.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1100. In various other embodiments of the present disclosure, a plurality of computer systems 1100 coupled by communication link 1130 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1100 may transmit and receive messages, data, information and instructions, including one or more programs (i.e., application code) through communication link 1130 and communication interface 1112. Received program code may be executed by processor 1104 as received and/or stored in disk drive component 1110 or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A payment service system, comprising:
   a non-transitory memory storing instructions; and
   one or more hardware processors coupled to the non-transitory memory and configured to read the instructions from the non-transitory memory to cause the payment service system to perform operations comprising:
      accessing, by the payment service system, a first electronic shopping cart comprising an item selected by a first user for a second user;
      performing a screen scrape of a device associated with the first user, wherein the performing the screen scrape comprises:
         parsing hypertext markup language (HTML) code of the item from a page displaying the first electronic shopping cart on the device;
      communicating information of the item from the parsed HTML code to a merchant e-commerce resource, wherein the merchant e-commerce resource comprises a search process for a merchant offer for the item;
      receiving the merchant offer for the item from the merchant e-commerce resource;
      receiving a merchant offer selection for the merchant offer for the item;
      generating, using an online resource of the payment service system, a second electronic shopping cart based on the first electronic shopping cart;
      entering the merchant offer selection into the second electronic shopping cart;
      receiving a form of funding for a value of the merchant offer selection from the first user to the second electronic shopping cart;
      transferring, by the payment service system, the second electronic shopping cart to the second user through an electronic address of the second user; and
      providing, by the payment service system with the second electronic shopping cart, the second user with a plurality of selectable options comprising a first option allowing the second user to accept the item from the first user and a second option allowing the second user to select a different item based on the value of the form of funding.

2. The payment service system of claim 1, the operations further comprising:
   receiving, by the payment service system, address information for the second user.

3. The payment service system of claim 2, wherein the receiving the address information comprises:
   obtaining, by the payment service system, the address information from a contact list in an electronic device associated with the first user.

4. The payment service system of claim 1, the operations further comprising:
   providing, by the payment service system, the plurality of selectable options with payment made using the form of funding to the second user prior to a purchase of the item being completed.

5. The payment service system of claim 1, wherein performing, by the payment service system, a search for the merchant offer for the item is from physical.

6. The payment service system of claim 5, wherein wherein the generating the second electronic shopping cart utilizes information about the item from the first electronic shopping cart, and wherein providing the second user with the plurality of selectable options comprises withholding, by the payment service system, payment prior to the second user selecting one of the plurality of selectable options.

7. The payment service system of claim 1, the operations further comprising:
   receiving, by the payment service system, a location identifier comprising global positioning system (GPS) data from an electronic device associated with the first user; and
   identifying, by the payment service system, the merchant offer for the item at a merchant associated with the received location identifier.

8. A non-transitory machine-readable medium having stored thereon machine-readable instructions executable to cause a machine to perform operations comprising:
   accessing, by a payment service system, a first electronic shopping cart comprising an item selected by a first user for a second user;

performing a screen scrape of a device associated with the first user, wherein the performing the screen scrape comprises:
  parsing hypertext markup language (HTML) code of the item from a page displaying the first electronic shopping cart on the device;
  communicating information of the item from the parsed HTML code to a merchant e-commerce resource, wherein the merchant e-commerce resource comprises a search process for a merchant offer for the item;
obtaining the merchant offer for the item from the merchant e-commerce resource;
receiving a merchant offer selection for the merchant offer for the item;
generating, using an online resource of the payment service system, a second electronic shopping cart based on information about the item from the first electronic shopping cart;
entering the merchant offer selection into the second electronic shopping cart;
receiving a form of funding for a value of the merchant offer selection from the first user to the second electronic shopping cart;
transferring, by the payment service system, the second electronic shopping cart to the second user through an electronic address of the second user; and
providing, by the payment service system with the second electronic shopping cart, the second user with a plurality of selectable options comprising a first option allowing the second user to accept the item from the first user and a second option allowing the second user to select a different item based on the value of the form of funding.

9. The non-transitory machine-readable medium of claim 8, wherein the operations further comprise:
receiving address information for the second user.

10. The non-transitory machine-readable medium of claim 8, wherein the operations further comprise:
receiving, by the payment service system, address information for the second user from an electronic device associated with the first user, wherein the address information is obtained from a contact list in the electronic device.

11. The non-transitory machine-readable medium of claim 8, wherein performing a search for merchant offer for the item is from at one or more physical merchant locations.

12. The non-transitory machine-readable medium of claim 11,
wherein the generating the second electronic shopping cart utilizes information about the item from the first electronic shopping cart, and wherein providing the second user with the plurality of selectable options comprises withholding, by the payment service system, payment with the one of the one or more physical merchant locations prior to the second user selecting one of the plurality of selectable options.

13. The non-transitory machine-readable medium of claim 8, the operations further comprising:
receiving, by the payment service system, a location identifier comprising global positioning system (GPS) data from an electronic device associated with the first user; and
identifying, by the payment service system, the merchant offer for the item at a merchant associated with the received location identifier.

14. The non-transitory machine-readable medium of claim 8, wherein the operations further comprise:

sending, by the payment service system, a notice to the first user that the second user has accepted the item in response to the second user selecting the first option.

15. A method, comprising:
accessing, by a payment service system, a first electronic shopping cart comprising an item selected by a first user for a second user;
performing a screen scrape of a device associated with the first user, wherein the performing the screen scrape comprises:
  parsing hypertext markup language (HTML) code of the item from a page displaying the first electronic shopping cart on the device;
  communicating information of the item from the parsed HTML code to a merchant e-commerce resource, wherein the merchant e-commerce resource comprises a search process for a merchant offer for the item;
receiving the merchant offer for the item from the merchant e-commerce resource;
receiving a merchant offer selection for the merchant offer for the item;
generating, using an online resource of the payment service system, a second electronic shopping cart for the item based on the first electronic shopping cart;
entering the merchant offer selection into the second electronic shopping cart;
receiving a form of funding for a value of the merchant offer selection from the first user to the second electronic shopping cart;
transferring, by the payment service system, the second electronic shopping cart to the second user through an electronic address of the second user; and
providing, by the payment service system with the second electronic shopping cart, the second user with a plurality of selectable options comprising a first option allowing the second user to accept the item from the first user and a second option allowing the second user to select a different item based on the value of the form of funding.

16. The method of claim 15, further comprising:
receiving, by the payment service system, address information for the second user obtained from a contact list in an electronic device associated with the first user.

17. The method of claim 15, further comprising:
providing, by the payment service system, the plurality of selectable options with payment made using the form of funding to the second user prior to a purchase of the item being completed.

18. The method of claim 15, wherein
by the payment service system, a search for the merchant offer for the item is from one or more physical merchant locations.

19. The method of claim 18,
wherein the generating the second electronic shopping cart utilizes the parsed information about the item from the first electronic shopping cart, and wherein providing the second user with the plurality of selectable options comprises withholding, by the payment service system, payment with the one of the one or more physical merchant locations prior to the second user selecting one of the plurality of selectable options.

20. The method of claim 15 the method further comprising:
receiving, by the payment service system, a location identifier comprising global positioning system (GPS) data from an electronic device associated with the first user; and identifying, by the payment service system, the merchant offer for the item at a merchant associated with the received location identifier.

\* \* \* \* \*

UNITED STATES PATENT AND TRADEMARK OFFICE
CERTIFICATE OF CORRECTION

PATENT NO. : 10,332,167 B2
APPLICATION NO. : 15/073143
DATED : June 25, 2019
INVENTOR(S) : German Carlos Scipioni and Suzin Declerck Wold Page 1 of 1

It is certified that error appears in the above-identified patent and that said Letters Patent is hereby corrected as shown below:

In the Claims

In Column 12, Line 45, delete "wherein"

In Column 14, Line 55, delete "the parsed"

Signed and Sealed this
Twenty-ninth Day of October, 2019

Andrei Iancu
*Director of the United States Patent and Trademark Office*